(12) United States Patent
Kameyoshi et al.

(10) Patent No.: US 6,532,739 B2
(45) Date of Patent: Mar. 18, 2003

(54) PRETENSIONER

(75) Inventors: Hikaru Kameyoshi, Tokyo (JP); Hiroki Takeara, Tokyo (JP); Tetsuya Hamaue, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/977,257

(22) Filed: Oct. 16, 2001

(65) Prior Publication Data

US 2002/0040582 A1 Apr. 11, 2002

Related U.S. Application Data

(63) Continuation-in-part of application No. 09/644,679, filed on Aug. 24, 2000.

(30) Foreign Application Priority Data

Aug. 25, 1999 (JP) ............................. 11-238784
Oct. 16, 2000 (JP) ...................... 2000-314586

(51) Int. Cl.[7] ............................................ F01B 29/08
(52) U.S. Cl. ........................................ 60/638; 60/632
(58) Field of Search ........................... 60/632, 634, 638

(56) References Cited

U.S. PATENT DOCUMENTS

| 4,442,674 A | 4/1984 | Föhl ............................. 60/632 |
| 4,444,010 A | 4/1984 | Bendler ........................ 60/407 |
| 5,303,631 A | 4/1994 | Frehaut et al. ............... 89/1.14 |
| 5,450,723 A | 9/1995 | Föhl ............................. 60/638 |
| 5,690,295 A | 11/1997 | Steinberg et al. ............ 242/374 |
| 5,875,634 A * | 3/1999 | Wohlenberg et al. ......... 60/632 |
| 5,881,962 A | 3/1999 | Schmidt et al. .............. 242/374 |
| 6,345,504 B1 * | 2/2002 | Takehara et al. .......... 60/632 X |
| 6,363,722 B1 * | 4/2002 | Takehara et al. ............... 60/632 |

FOREIGN PATENT DOCUMENTS

| DE | 195 12 660 | 10/1995 |
| DE | 195 45 795 C1 | 3/1997 |
| DE | 199 09 938 | 8/2000 |
| DE | 100 08 824 | 9/2000 |
| EP | 0 680 856 | 3/1995 |
| GB | 2347 124 | 8/2000 |
| JP | 2001-063520 | 3/2001 |
| JP | 2001-635194 | 3/2001 |
| JP | 2001-151077 | 5/2001 |
| WO | WO 95/27638 | 10/1995 |
| WO | WO 96/25310 | 8/1996 |

* cited by examiner

*Primary Examiner*—Hoang Nguyen
(74) *Attorney, Agent, or Firm*—Foley & Lardner

(57) ABSTRACT

An improved pretensioner which achieves more stable operation and reduction in power loss. The pretensioner includes a gas generator, a pipe containing a plurality of balls and a piston, and a clutch for connecting the pretensioner to a spool for a seat belt. A gas release hole is formed in the pipe in such a position that before the piston moves the hole is between the piston and the first ball and when the coupling of the clutch is completed by the movement of the accelerated balls and the hole is located between the gas generator and the piston.

8 Claims, 5 Drawing Sheets

PRETENSIONER

CROSS-REFERENCE TO RELATED APPLICATION

This application is a continuation-in-part of U.S. Pat. Ser. No. 09/644,679 entitled "PRETENSIONER WITH GAS ESCAPE MECHANISM" and filed on Aug. 24, 2000, the disclosure of which is incorporated by reference herein in its entirety.

BACKGROUND

The present invention relates to a pretensioner which is installed in a seat belt device for restraining an occupant to a vehicle seat and which rapidly rotates a reel shaft of a seat belt retractor in the belt winding direction. More particularly, the present invention relates to a pretensioner which achieves more stable operation and reduction in power loss of a gas generator.

Vehicles such as automobiles are equipped with seat belt devices. In recent years, the ratio of seat belt devices with pretensioners has been increasing. The function of a pretensioner is applying tension to a seat belt to remove slack of the seat belt by rapidly rotating a spool (reel shaft) on which the seat belt is wound. A typical type of pretensioner has explosive which is detonated in accordance with a signal emitted in the event of collision and drives a mechanism for rotating a spool with gas pressure derived from explosion of the explosive.

The pretensioner may include a pipe having a gas generator fixed to one end. Arranged inside the pipe are a piston and a plurality of balls. At the other end of the pipe, a guide block is fitted. A ring gear having a plurality of external teeth on the outer periphery thereof and a plurality of internal teeth on the inner periphery thereof is provided in the pretensioner. One or more of the external teeth of the ring gear enter into the pipe so that the front-most ball is in contact with one of the external teeth of the ring gear.

Inside of the ring gear, a pinion is positioned to be fitted to the spool gear of the spool. Internal teeth of the ring gear and the external teeth of the pinion are designed to be meshed with each other. When the gas generator is activated to generate gas, the balls are pushed via the piston by the pressure of gas. The ring gear is forced to rotate by the balls and the internal teeth of the ring gear and the external teeth of the pinion mesh together. Thus, the spool rotates via the pinion coupled with the ring gear. In this manner, the seat belt is pretensioned.

As tension exceeding a predetermined value is exerted to the seat belt, the spool is gradually rotated in the belt-unwinding direction with twisting of a torsion bar. Because of this torsional deformation of the torsion bar, impact to be applied to the occupant by the seat belt is absorbed and reduced (i.e. Energy Absorption (EA) Operation is performed).

During the EA operation, the spool rotates in the belt-unwinding direction due to the deformation of the torsion bar, thereby pushing balls to move back toward the gas generator. When gas pressure still exists in the pipe upstream of the balls and downstream of the gas generator, the balls are subjected to the gas pressure. The locations of the balls in the pipe at the start of the EA operation depend on the size and the attitude of the occupant. It is difficult to determine how and to what extent the balls move forward when the EA operation is started.

Therefore, it has been proposed that the pipe include a hole in the side wall located between the the gas generator and the piston to allow gas to discharge. However, due to its location gas may discharge through this hole even at the initial stage of activation of the pretensioner. This may reduce the power of the pretensioner and cause a problem.

Therefore there remains a need to provide a pretensioner which achieves more stable operation and provides for reduced power loss.

SUMMARY OF THE INVENTION

According to the present invention a pretensioner which rotates a spool of a seat belt retractor to pretension a seat belt in the event of an emergency is provided. The pretensioner includes a gas generator; a pipe connected to the gas generator and positioned to receive generated gas, and a plurality of balls which are arranged in series in the pipe to be accelerated by the generated gas in a direction away from the gas generator. The ball which is nearest to the gas generator is a piston which is designed to provide gas-tight seal relative to the wall of the pipe. The pretensioner further includes a means for converting the movement of the accelerated balls to a force for rotating the spool. The means includes a clutch for coupling the pretensioner to the spool. The pretensioner further includes a gas release hole formed in the pipe in such a position that before the piston moves the piston is between the hole and the gas generator and when the coupling of the clutch is completed by the movement of the accelerated balls and the piston the hole is located between the gas generator and the piston.

Preferably, the means for converting includes a ring gear having external teeth for receiving at least one of the plurality of balls. The ring gear may include internal teeth for engaging a pinion connected to the spool. The pretensioner may also include pins preventing that prevent the ring gear from engaging the pinion prior to activation of the gas generator.

In another embodiment of the present invention a seat belt pretensioner comprising a plurality of balls positioned in a pipe is provided. The pipe is connected to a gas generator configured so that when generated gas enters the pipe the balls are accelerated toward a clutch mechanism for converting the movement of the balls into rotation of a spool for a seat belt. The pipe includes a hole in a wall positioned so that before the balls move the hole is sealed off from generated gas by the ball closest to the gas generator. When the clutch mechanism begins to effect rotation of the spool the hole is located between the gas generator and the ball closest to the gas generator thereby allowing gas to escape.

According to the aforementioned embodiment, the ball closest to the gas generator may be a piston providing a gas tight seal relative to an interior wall of the pipe.

In another alternative embodiment of the present invention a gas release mechanism for a seat belt pretensioner is provided. The pretensioner includes a gas generator connected to a pipe having a plurality of balls. The gas release mechanism includes a hole in the pipe positioned so that before the balls move due to the generated gas the hole is isolated from the gas generator by one of the balls. The hole is positioned so that when pretensioning of the seat belt begins the hole is located between the gas generator and the ball closest to the gas generator thereby releasing gas out of the pipe.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

DETAILED DESCRIPTION

Hereinafter, the present invention will be described with reference to the attached drawings. In these drawings, some parts are not illustrated because these are not necessary for describing the present invention. First, description will be made as regard to the basic structure of the seat belt retractor.

Figure 3:
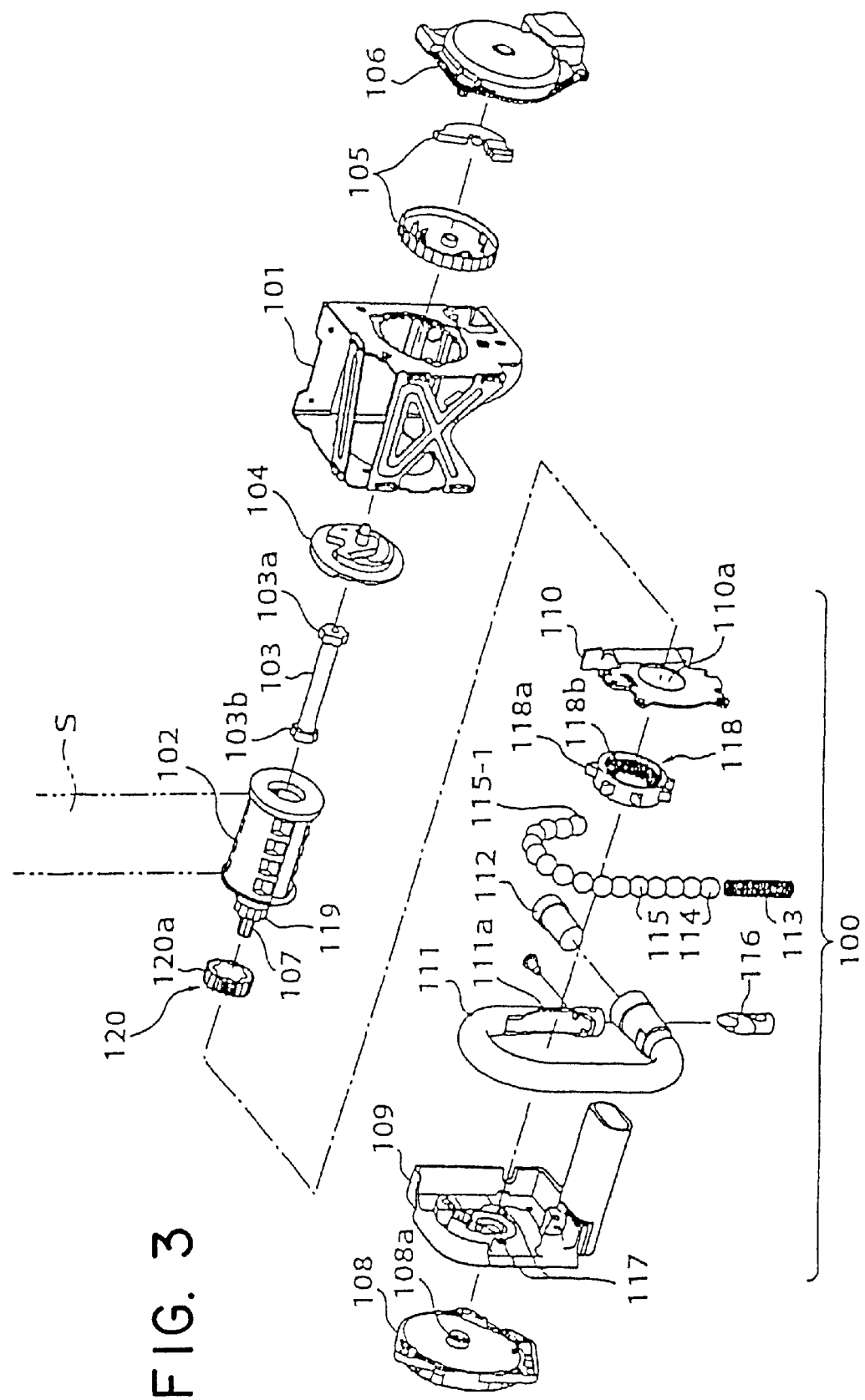
FIG. 3 is an exploded perspective view showing one example of seat belt retractor with a pretensioner.
Figure 4:
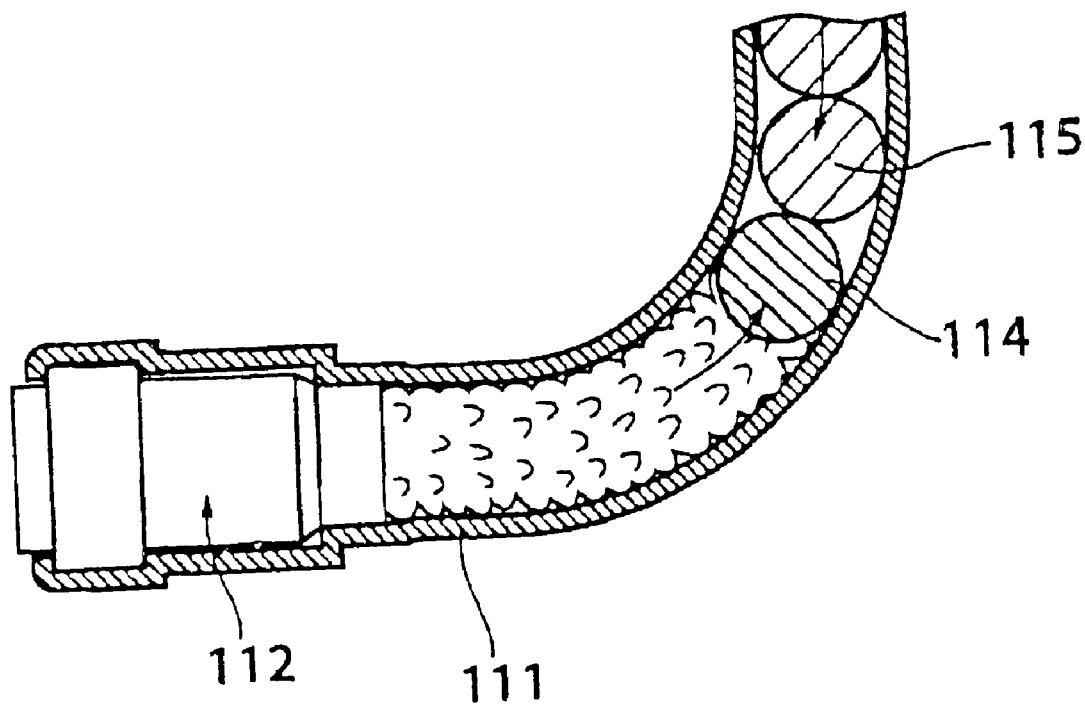
FIG. 4 is a frontal sectional view illustrating the structure of a proximal end portion of a pipe for the pretensioner.
Figure 5:
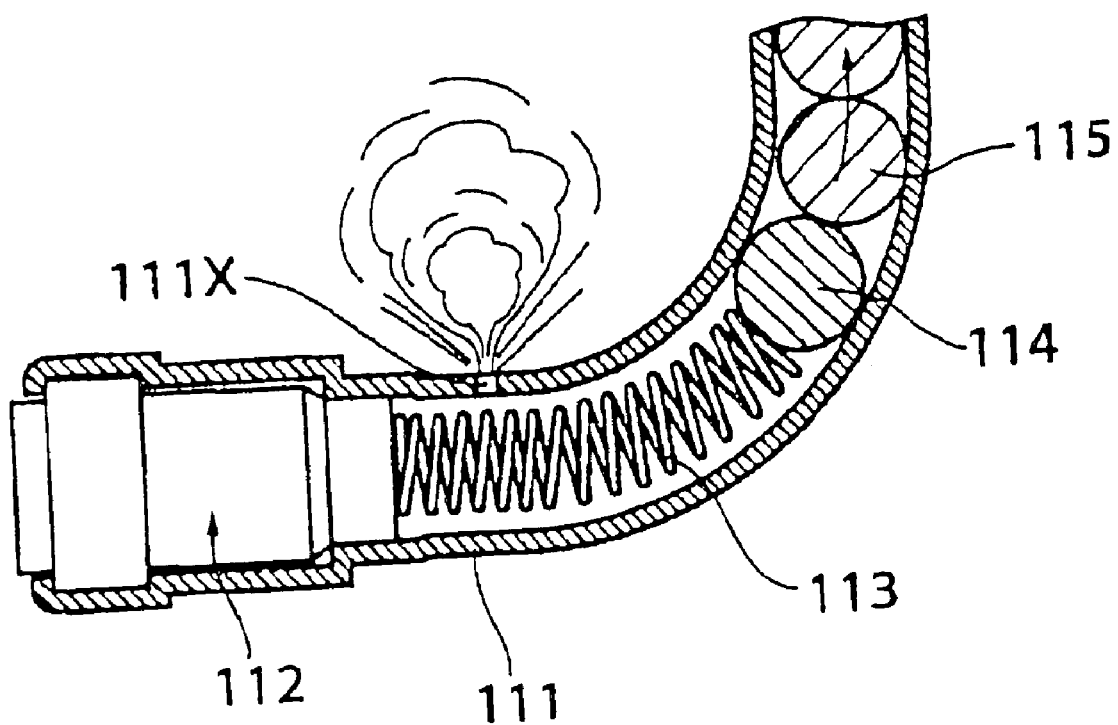
FIG. 5 is a frontal sectional view illustrating the structure of a proximal end portion of a pipe for the pretensioner.

FIG. 3 is an exploded perspective view showing one example of seat belt retractor with a pretensioner. FIGS. 4 and 5 are frontal sectional views illustrating the structure of a proximal end portion of a pipe for the pretensioner.

In FIG. 3, numeral 101 designates a base frame. A spool 102 is rotatably received in the base frame 101. Wound on the spool 102 is a seat belt S. Rotation of the spool 102 causes winding/unwinding of the seat belt S. The spool 102 is provided with a torsion bar 103 along the axis of the spool 102.

One end 103a (the right end in FIG. 3) of the torsion bar 103 is supported by a retainer 106 via two locking mechanisms 104, 105. The other end 103b (the left end in FIG. 3) of the torsion bar 103 is fixed inside the spool 102. On the left end face of the spool 102, a spool shaft 107 and a spool gear 119 are integrally formed and fixed. The spool shaft 107 extends through the inside of a pretensioner 100 and is meshed with a gear 108a in a return spring cover 108. Thus, the spool 2 is biased in a direction of winding up the seat belt S by a return spring in the return spring cover 108.

The seat belt retractor having the aforementioned basic structure is provided with the pretensioner 100. Hereinafter, the structure of the pretensioner 100 will be described.

The pretensioner 100 shown in FIG. 3 comprises a pipe 111. The pipe 111 is disposed between a pretensioner cover 109 and a pretensioner plate 110. At the proximal end of the pipe 111, a gas generator 112 is fixed. Arranged inside the pipe 111 are, in the order from the gas generator 112, a stopper spring 113, a piston 114, and a plurality of balls 115 (15 balls in the illustrated example). At the other end of the pipe 111, a guide block 16 is fitted. The pipe 111 has a cut-out 111a in a peripheral portion near the other end thereof.

The pretensioner cover 109 is provided with two pins 117 fixed thereto. A ring gear 118 is held to the pretensioner cover 109 by the pins 117. The ring gear 118 has a plurality of external teeth 118a on the outer periphery thereof and a plurality of internal teeth 118b on the inner periphery thereof. One or more of the external teeth 118a of the ring gear 118 enter in the cut-out 111a of the pipe 111. The front-most ball 115-1 is in contact with one of the external teeth 118a of the ring gear 118.

Inside of the ring gear 118, a pinion 120 is positioned to be fitted to the spool gear 119 of the spool 102. The pinion 120 has a plurality of external teeth 120a formed on the outer periphery thereof. The internal teeth 118b of the ring gear 118 and the external teeth 120a are designed to be meshed with each other. In the normal state (before the activation of the pretensioner), a predetermined clearance is ensured between the internal teeth 118b of the ring gear 118 and external teeth 120a of the pinion 120 (see FIG. 1).

The operation of the pretensioner 100 is described below. Before the activation of the pretensioner 100, the ring gear 118 is held by the pins 117. In this state, the ring gear 118 and the pinion 120 are out of mesh. Therefore, the spool 102 can freely rotate. When the gas generator 112 is activated to generate gas, however, the balls 115 are pushed via the piston 114 by the pressure of gas (see FIG. 4). As a result, the pins 117 are sheared by forces from the balls 115, whereby the ring gear 118 is released to be free and the internal teeth 118b of the ring gear 118 and the external teeth 120a of the pinion 120 are meshed with each other. As the ring gear 118 is forced to be rotated by the balls 115, the spool 102 is rotated via the pinion 120 coupled with the ring gear 118. In this manner, the seat belt is pretensioned.

As tension exceeding a predetermined value is exerted to the seat belt S, the spool 102 is gradually rotated in the belt-unwinding direction with twisting the torsion bar 103. Because of this torsional deformation of the torsion bar 103, impact to be applied to the occupant by the seat belt S is absorbed and thus reduced (Energy Absorption (EA) Operation).

Gas from the gas generator 112 does not leak to the ball side because of sealing function of the piston 114 so that the gas pressure exists in the proximal end portion of the pipe 111. On the other hand, during the EA operation, the spool 102 is rotated in the belt-unwinding direction by the torsional deformation of the torsion bar 103, thereby pushing balls 115 to move back toward the proximal end of the pipe 111. When gas pressure still exists in the proximal end portion of the pipe 111, the balls 115 are subjected to the gas pressure. The locations of the balls 115 in the pipe 111 at the start of the EA operation depend on the size and the attitude of the occupant. It is impossible to specify how or to what extent the balls 115 move forward when the EA operation is started.

In some cases, a hole 111X is provided in a side wall of the pipe 111 positioned between the gas generator 112 and the piston 114 as shown in FIG. 5, to allow gas to discharge through this hole 111X. However, gas may discharge through this hole 111X even at the initial stage of activation of the pretensioner 100. This may reduce the power of the pretensioner 100 to an insufficient level.

The present invention solves the aforementioned problems and provides a pretensioner which achieves more stable operation and reduction in power loss of the pretensioner.

The present invention provides a pretensioner which rotates a spool of a seat belt retractor to pretension a seat belt in the event of an emergency, and comprises: a gas generator; a pipe into which gas generated by the gas generator is blown; a plurality of serial balls which are arranged in the pipe to be accelerated by the gas in a direction away from the gas generator; and means for converting the movement of the accelerated balls to force for rotating the spool, the means including a clutch for coupling the pretensioner to the spool. The pretensioner is characterized in that the pipe is provided with a gas release hole formed therein, one of the balls which is nearest to the gas generator is a piston which is designed to provide gas-tight seal relative to the wall of the pipe, and the gas release hole is formed at such a position that the gas release hole is on the way to be passed by the piston before the piston moves and is on the way already passed by the piston, i.e. between the gas generator and the piston, when the coupling of the clutch is completed by the movement of the accelerated balls.

According to the present invention, since the piston is positioned between the gas generator and the gas release hole, i.e. on the gas generator side of the gas release hole, at the start of actuation of the pretensioner, no gas leaks on the way of driving the balls. Therefore, no power loss of the pretensioner due to gas leakage is caused.

After the coupling of the clutch is completed by the movement of the balls which are accelerated by gas, the gas release hole is open and therefore gas is released through this gas release hole even when the EA operation is started immediately after the actuation of the pretensioner due to large tension on the seat belt, the EA operation can be smoothly operated because the resistance against movement of the balls pushed back toward the gas generator is reduced.

Figure 1:
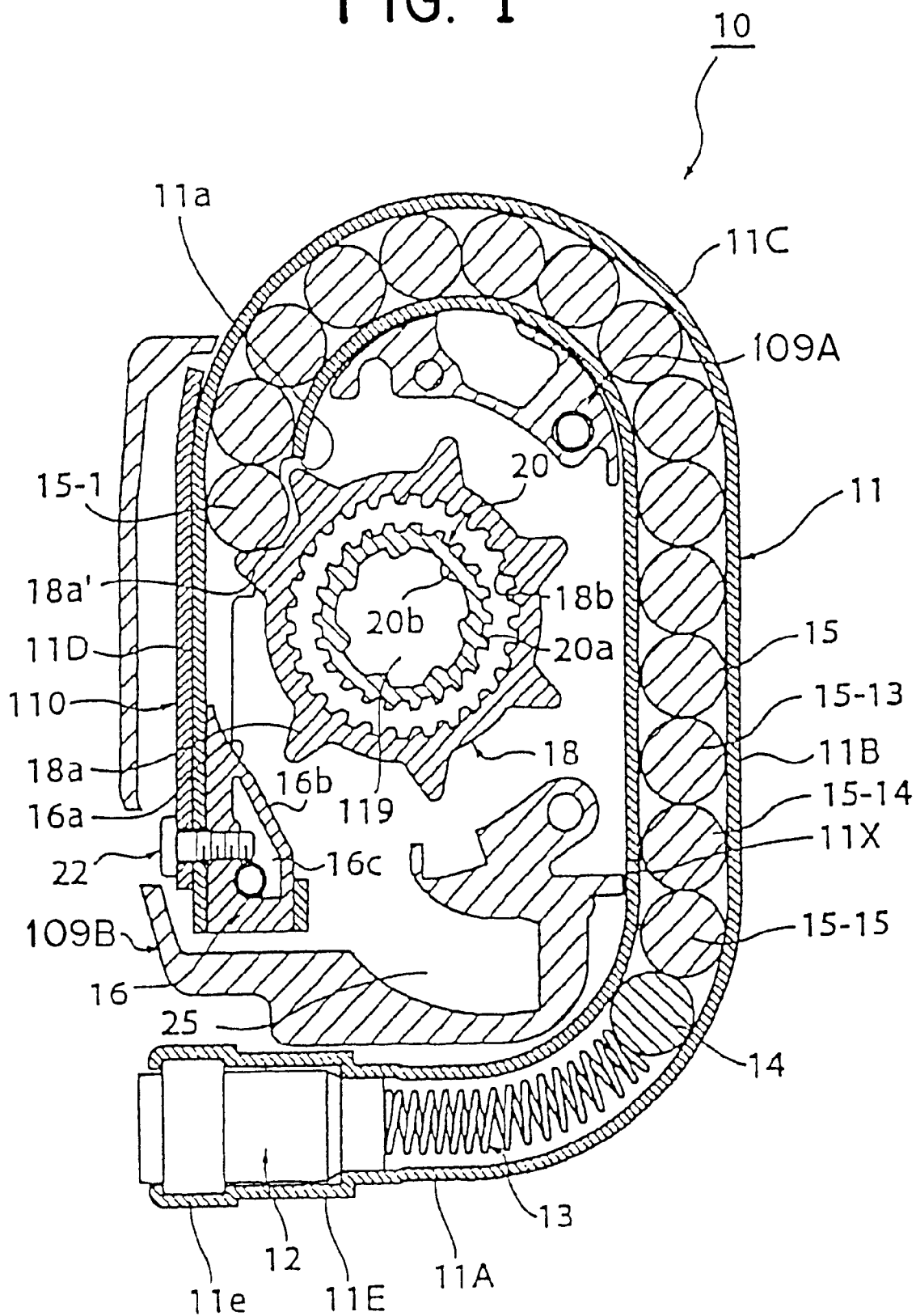
FIG. 1 is a frontal sectional view of a pretensioner according to an embodiment of the present invention, showing the state before the activation.

FIG. 1 is a frontal sectional view of a pretensioner according to an embodiment of the present invention, showing the state before the activation.

Figure 2:
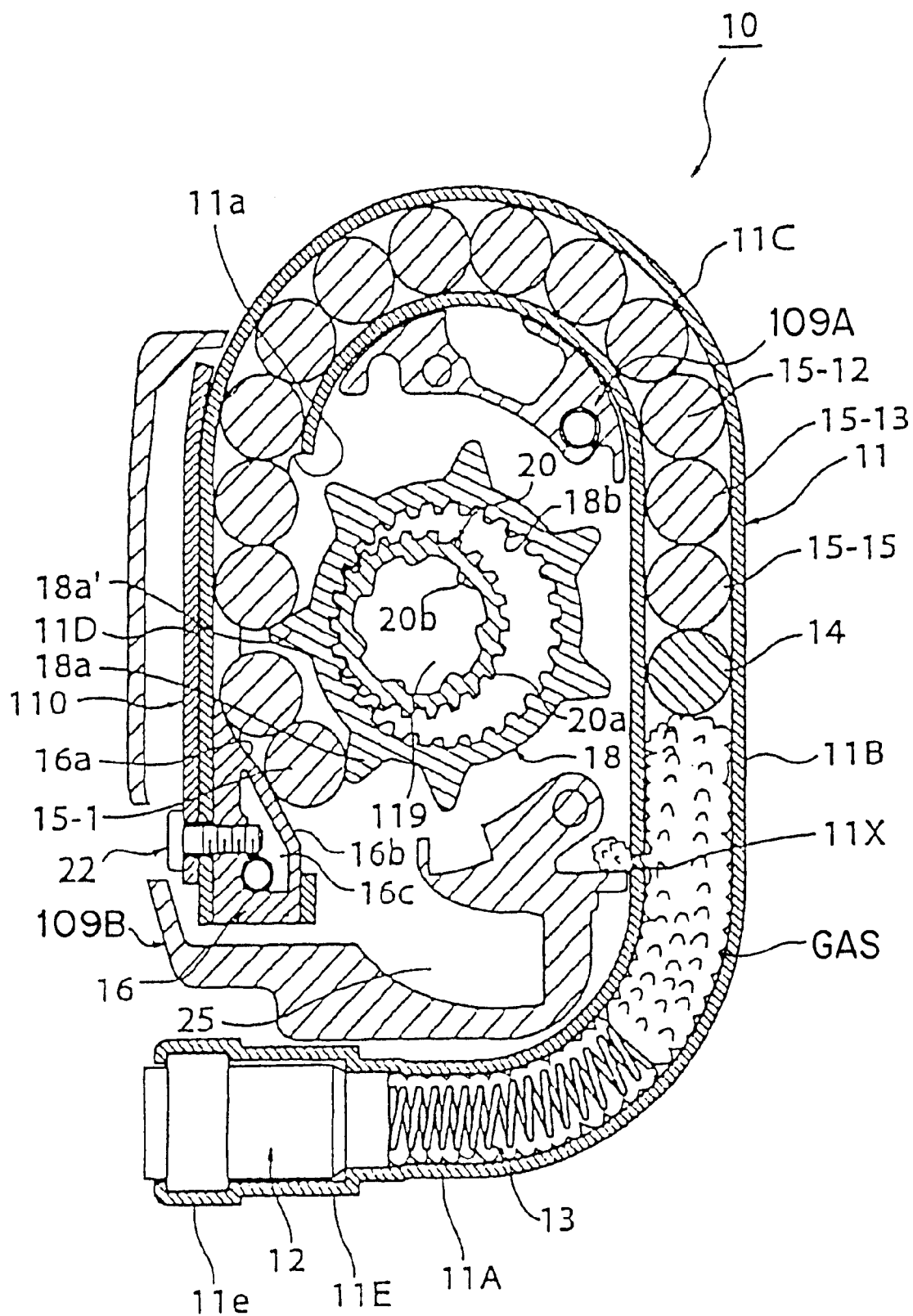
FIG. 2 is a frontal sectional view of the pretensioner, showing the state just after the start of activation.

FIG. 2 is a frontal sectional view of the pretensioner, showing the state just after the activation. The pretensioner shown in FIGS. 1 and 2 is assembled in a seat belt retractor as mentioned above (see FIG. 3). The basic structure of the seat belt retractor is the same as the one shown in FIG. 3.

The pretensioner 10 will now be described with reference to FIG. 1 through FIG. 3. The pretensioner 10 comprises a pipe 11. The pipe 11 is interposed between the pretensioner cover 109 and the pretensioner plate 110 (see FIG. 3) and, in this state, is attached to the outside of a side wall of the base frame 101 (see FIG. 3). The pipe 11 is a steel pipe which is processed by bending (as an example). The pipe 11 comprises a bent part which continuously extends from the proximal end 11A at the bottom side in the drawings and is bent at approximately 90° from the proximal end 11A toward the upper right, a straight part 11B which continuously extends from the bent part, and a semicircular part 11C at the top side in the drawings which continuously extends from the straight part 11B. The pipe 11 further comprises a straight part 11D continuously extending downwardly from the semi-circular part 11C. Formed in the straight part 11D is a cut-out 11a facing an area surrounded by the pipe 11. In the cut-out 11a, portions of one or more of external teeth 18a of a ring gear 18 described later enter.

The ring gear 18 is arranged in the area surrounded by the pipe 11 (this area will be referred to as "the inner area formed by the pipe 11"). The ring gear 18 is held at a predetermined position in the inner area formed by the pipe 11 by two pins 117 (see FIG. 3) of the pretensioner cover 109. Also arranged inside the inner area formed by the pipe 11 is a pinion 20. The pinion 20 has external teeth 20a formed around the outer periphery thereof and internal teeth 20b formed around the inner periphery thereof. The pinion 20 is fixedly fitted around the spool gear 119 of the spool 102 (see FIG. 3).

Formed around the inner periphery of the ring gear 18 are inner teeth 18b capable of meshing with the external teeth 20a of the pinion 20. Since the inner diameter of the ring gear 18 is larger than the outer diameter of the pinion 20, a clearance is ensured between the internal teeth 18b of the ring gear 18 and the external teeth 20a of the pinion 20 so that the ring gear 18 and the pinion 20 are out of mesh in the state shown in FIG. 1. Therefore, the spool 102 (see FIG. 3) can freely rotate, in spite of the existence of the pretensioner 10. This state means the decoupled state of a clutch mechanism composed of the ring gear 18 and the pinion 20.

The ring gear 18 has a plurality of external teeth 18a formed around the outer periphery thereof. The external teeth 18a project outwardly just like projections (the number of the teeth is seven in the illustrated example). Though the respective external teeth are generally equally spaced, the tooth marked by numeral 18a' is offset. The offset tooth 18a' is positioned inside the cut-off 11a of the straight portion 11D of the pipe 11 and is in contact with the front-most ball 15-1 (described further below) in the pipe 11.

Formed at the proximal end 11A of the pipe 11 is a generator-housing portion 11E of which diameter is slightly larger than that of the pipe 11. A gas generator 12 is housed in the generator-housing portion 11E. The gas generator 12 ignites explosive therein according to a signal outputted from a collision detecting means (not shown) in the event of an accident such as a vehicle collision so as to supply gas pressure into the pipe 11. The gas generator 12 is fixed by a crimped flange portion lie after inserted in the generator-housing portion 11E.

Arranged inside the pipe 11 are, in the order from the gas generator 12, a coil spring 13, a piston 14, and a plurality of balls 15 (15 balls in the illustrated example). Each ball 15 is a sphere made of metal such as steel. The outer diameter of the ball 15 is slightly smaller than the inner diameter of the pipe 11, thus allowing relative smooth movement of the balls inside the pipe 11. The front-most ball 15-1 is in contact with the external tooth 18a' of the ring gear 18.

The piston 14 is made of resin such as silicone rubber. The piston 14 is deformed to increase its diameter after the discharge of gas so that the piston 14 comes in close contact with the inner surface of the pipe 11, thereby achieving sealing function for preventing gas from leaking to the distal end (the other end) side.

The coil spring 13 is disposed between the gas generator 12 and the piston 14 to bias the piston 14 in a direction toward the distal end. Because of the biasing force of the coil spring 13, the front-most ball 15-1 is in contact with the external tooth 18a' of the ring gear 18.

A guide block 16 is attached to the end of the straight portion 11D of the pipe 11 by a vis or screw 22. The guide block 16 is a cylindrical member having a slant end face which is formed by obliquely cutting. This slant end face functions as a guide face. The guide face comprises a first guide face 16a and a second guide face 16b. The first guide face 16a is formed at the top end of the guide block into an arc shape substantially concentrical with the ring gear 18. During the actuation of the pretensioner, balls 15 are forced out of the pipe 11 and then collide with the first guide face 16a. On the other hand, the second guide face 16b is a flat face which extend in such a way as to gradually increase the distance from the ring gear 18. It should be noted that the vis 22 also functions of fixing the pipe 11 to the pretensioner plate 110 (see FIG. 3).

The guide block 16 has a through opening 16c which is formed through it to extend from one side to the opposite side along the width direction of the guide face. The through opening 16c is formed in a portion substantially beneath the second guide face 16b. Because of this through opening 16c, most of the second guide face 16b is a thin plate so that the second guide face 16b has poor rigidity. On the other hand, the first guide face 16a has high rigidity because it is backed up by the side walls of the guide block 16 itself.

In FIG. 1 and FIG. 2, numerals 109A, 109B designate portions, shown in sections, of the pretensioner cover 109

(see FIG. 3). The upper portion 109A retains the pipe 11 and the lower portion 109B composes a ball receiving part 25. Balls 15 forced out of the pipe 11 are gathered in the ball receiving part 25.

As shown in FIG. 1 and FIG. 2, the pipe 11 is provided with a gas release hole 11X formed in a lower portion of the straight part 11B. The gas release hole 11X opens toward the inner area formed by the pipe 11. The gas release hole 11X is formed at such a position that the gas release hole 11X is on the way to be passed by the piston 14, i.e. on a side across the piston 14 from the gas generator 12, before the actuation of the pretensioner as shown in FIG. 1 and is on the way already passed by the piston 14, i.e. between the piston 14 and the gas generator 12, when the coupling of the clutch mechanism is completed, i.e. the ring gear 18 and the pinion 20 are coupled with each other as shown in FIG. 2.

Hereinafter, the operation of the pretensioner 10 having the aforementioned structure will be described. When the pretensioner is not actuated (i.e., in the normal state), the ring gear 18 is held in its predetermined position in the inner area formed by the pipe 11 by the two pins 117 (see FIG. 3) of the pretensioner cover 109 and the internal teeth 18b of the ring gear 18 are meshed with none of the external teeth 20a of the pinion 20 as shown in FIG. 1. Therefore, the pretensioner 10 in this state has no effect on the rotation of the spool 102.

As a vehicle collision is detected, a signal is transmitted to the gas generator 12. According to this signal, as shown in FIG. 2, the gas generator 12 is activated to supply gas pressure into the pipe 11. The piston 14 which is nearest to the gas generator 12 is pushed by the gas pressure. The force on the piston 14 is transmitted to the balls 15 in order. Thus, the force is transmitted to the front-most ball 15-1 (which is in contact with the external tooth 18a' of the ring gear 18). During this, the gas pressure deforms and increase the diameter of the piston so that the piston 14 functions as seal relative to the inner surface of the pipe 11, thereby preventing gas from leaking to the distal end side. As mentioned above, since the piston 14 is on the gas generator side of the gas release hole 11X of the pipe 11 at the start of actuation of the pretensioner 10, no gas leaks on the way of driving the balls 15, so no power loss of the pretensioner 10 is caused.

The force transmitted through the balls 15 exerts force on the ring gear 18. As a result of this, the pins 117 (see FIG. 3) are sheared so as to release the ring gear 18. Therefore, the ring gear 18 moves to the pinion 20, whereby the internal teeth 18b of the ring gear 18 are meshed with the external teeth 20a of the pinion 20, that is, the clutch mechanism becomes in the coupled state. The ring gear 18 is rotated about the shaft of the pinion 20 by the force of the balls 15 pushing the external teeth 18a. Before the ring gear 18 starts to move, the front-most ball 15-1 is in contact with the external tooth 18a' of the ring gear 18 in such an attitude of applying torque to the external tooth 18a', thereby ensuring the rotation of the ring gear 18.

As the balls 15 are continuously pushed out by the gas pressure, each ball 15 falls in corresponding one of valleys formed between the external teeth 18a of the ring gear 18. In this case, one valley of the ring gear 18 corresponds to and is engaged with two balls 15. The engagements of the balls 15 rotates the ring gear 18 in the counter-clockwise direction in FIG. 2. Since the external teeth 20a of the pinion and the internal teeth 18b of the ring gear 18 are meshed with each other, the rotation of the ring gear 18 is transmitted to the pinion 20 so that the ring gear 18 and the pinion 20 move with each other. Since the pinion 20 is fitted to the spool gear 119 of the spool 102, the spool 102 rotates with the rotation of the pinion 20, thereby immediately taking up some length of the seat belt S (see FIG. 3) in the belt-winding direction. The balls 15 are forced out of the pipe 11 through the end opening 21b of the pipe 11 and are gathered into the ball receiving portion 25.

In this state, as tension exceeding a predetermined value is exerted to the seat belt S, the spool 102 shown in FIG. 3 is gradually rotated in the belt-unwinding direction with twisting the torsion bar 103. Because of this torsional deformation of the torsion bar 103, impact to be applied to the occupant by the seat belt S is absorbed and thus reduced. At this point, the ring gear 18 and the pinion 20 are already coupled with each other because of the balls 15 pushed by gas pressure produced from the gas generator 12 and the piston 14 thus advances at least a distance corresponding two or three balls (balls 15-13 through 15-15) of the fifteen balls 15-1 through 15-15, whereby the piston 14 passes the gas release hole 11X of the pipe 11. It should be noted that the state of the activation of the pretensioner 10 shown in FIG. 2 is only an illustrative example so that the location of the piston 14 in the pipe 111 depends on the size and the attitude (i.e. position) of the occupant and the relationship between the occupant and the seat belt.

However, since the gas release hole 11X of the pipe 11 is positioned at the proximal end side (the gas generator side) about the piston 14 after the completion of the coupling between the ring gear 18 and the pinion 20, the gas release hole 11X is open and therefore gas is discharged through the gas release hole 11X. The discharging of gas reduces resistance against movement of the piston and the balls 15 returning toward the gas generator 12. When, immediately after the actuation of the pretensioner 10, large tension is exerted to the seat belt and the EA operation is thus started so that the spool 102 is rotated in the belt-unwinding direction with twisting the torsion bar 103, the ring gear 18 is rotated in the clockwise direction in FIG. 2 to push back the balls 15. At this point, the balls 15 can be smoothly pushed back toward the gas generator 12 because of the function of the gas release hole 11X. As mentioned, even when the EA operation is started immediately after the actuation of the pretensioner 10, the EA operation can be smoothly operated because the resistance against movement of the balls 15 pushed back toward the gas generator 12 is reduced.

As described in the above, the present invention can provide a pretensioner which achieved more stable operation and reduction in power loss of the pretensioner.

The priority application Japanese Patent Application No. 2000-314586 is incorporated by reference herein in its entirety. Japanese patent application H 11-238784 (priority claimed in the parent application) is now published as 2001-163182 and is also incorporated by reference herein in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A pretensioner which rotates a spool of a seat belt retractor to pretension a seat belt in the event of an emergency, comprising:

a gas generator;

a pipe connected to the gas generator and positioned to receive generated gas;

a plurality of balls which are arranged in series in the pipe to be accelerated by the generated gas in a direction away from the gas generator; and wherein the ball which is nearest to the gas generator is a piston which is designed to provide gas-tight seal relative to the wall of the pipe;

means for converting the movement of the accelerated balls to a force for rotating the spool, the means including a clutch for coupling the pretensioner to the spool; and a gas release hole formed in the pipe in such a position that before the piston moves the piston is between the hole and the gas generator and when the coupling of the clutch is completed by the movement of the accelerated balls and the piston the hole is located between the gas generator and the piston.

2. The pretensioner of claim 1, wherein the means for converting includes a ring gear having external teeth for receiving at least one of the plurality of balls.

3. The pretensioner of claim 2, wherein the ring gear includes internal teeth for engaging a pinion connected to the spool.

4. The pretensioner of claim 3, further comprising pins preventing that prevent the ring gear from engaging the pinion prior to activation of the gas generator.

5. A seat belt pretensioner comprising a plurality of balls positioned in a pipe connected to a gas generator configured so that when generated gas enters the pipe the balls are accelerated toward a clutch mechanism for converting the movement of the balls into rotation of a spool for a seat belt, the pipe including a hole in a wall positioned so that before the balls move the hole is sealed off from generated gas by the ball closest to the gas generator, and when the clutch mechanism begins to effect rotation of the spool the hole is located between the gas generator and the ball closest to the gas generator thereby allowing gas to escape.

6. The pretensioner of claim 5, wherein the ball closest to the gas generator is a piston providing a gas tight seal relative to an interior wall of the pipe.

7. A gas release mechanism for a seat belt pretensioner including a gas generator connected to a pipe having a plurality of balls, the mechanism comprising a hole in the pipe positioned so that before the balls move due to the generated gas the hole is isolated from the gas generator by one of the balls and when pretensioning of the seat belt begins the hole is located between the gas generator and the ball closest to the gas generator thereby releasing gas out of the pipe.

8. The gas release mechanism of claim 7, wherein the ball closest to the gas generator provides a gas tight seal with the pipe to thereby isolate the hole from the gas generator.

* * * * *